MAGNETIC AMPLIFIER REGULATED VOLTAGE SUPPLY SYSTEM

Filed Dec. 22, 1964

INVENTOR

Henri H. Hoge

BY Karl W. Flocks

ATTORNEY 3,376,498
Patented Apr. 2, 1968

3,376,498

MAGNETIC AMPLIFIER REGULATED VOLTAGE SUPPLY SYSTEM

Henri H. Hoge, Baltimore, Md., assignor to Summit Electronics Inc., Baltimore, Md., a corporation of Maryland Filed Dec. 22, 1964, Ser. No. 420,282
3 Claims. (Cl. 323—89)

ABSTRACT OF THE DISCLOSURE

Circuitry limiting the voltage amplitude from a square wave source connected to a magnetic amplifier which in turn is connected to silicon controlled rectifiers supplying constant firing times thereto.

The present invention relates generally to voltage regulation and has particular reference to the circuitry associated with a magnetic amplifier in such a system.

Accordingly, the present invention is directed to a regulated supply system used to supply a constant voltage to a magnetic amplifier and at the same time supply a back bias voltage to allow the cores of the magnetic amplifier to be reset by the control current in the control winding with minimum loading of the circuit.

Therefore it is an object of this invention to provide a magnetic amplifier with constant firing times although the voltages supplied to the circuit vary in amplitude.

It is also an object of this invention to allow the cores of the magnetic amplifier to reset completely without imposing a load on the control circuit of the magnetic amplifier.

One of the contemplated applications of the new circuit is in the control of the gating of silicon controlled rectifiers.

Other objects and advantages will be apparent from a detailed description of the invention and from the appended drawings wherein.

Figure 1:
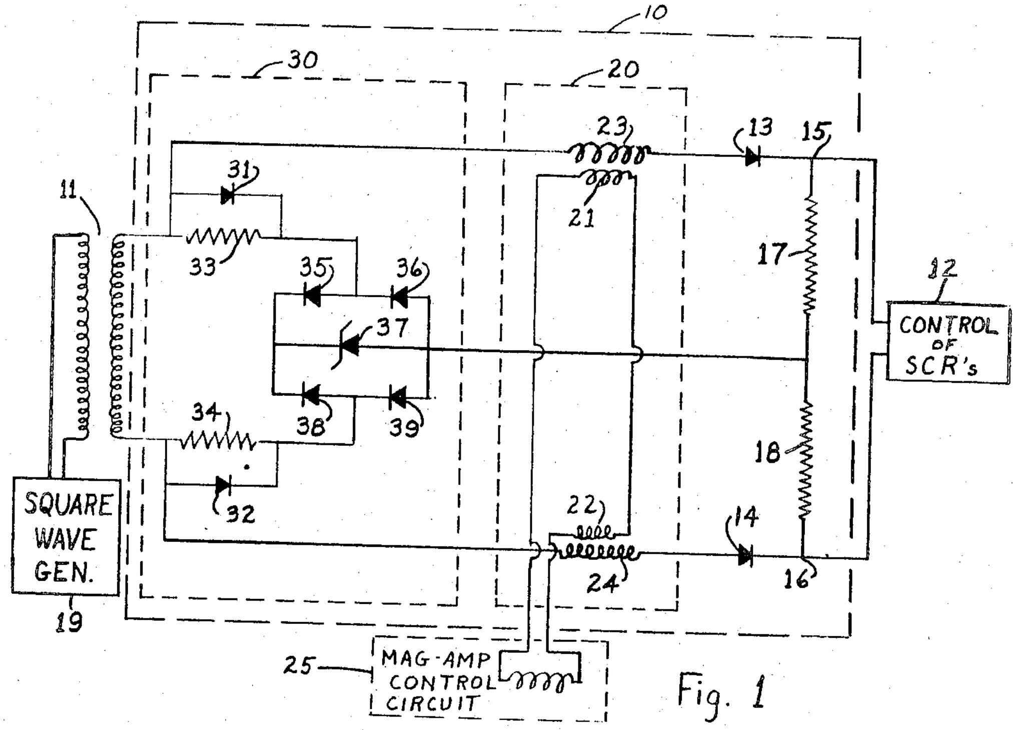
FIG. 1 is a circuit diagram of the system of the present invention.

Referring to FIG. 1, there is shown a regulator 10 fed by a transformer 11. Regulator 10 may have its output used to control silicon controlled rectifiers 12 through the driving of their gates.

Regulator 10 includes a magnetic amplifier 20 and a circuit 30 which supplies a constant voltage to magnetic amplifier 20 and also supplies a back bias voltage to allow the magnetic amplifier to be reset by the current in its control windings 21 and 22 with minimum loading on control circuit 25.

Circuit 30 comprises diodes 31 and 32 connected respectively to opposite ends of the secondary winding of transformer 11 and has resistances 33 and 34 respectively in parallel with diodes 31 and 32. The opposite ends of diodes 31 and 32 are connected to a parallel arrangement of three circuit lines comprising serially connected diodes 35 and 36, zener diode 37, and serially connected diodes 38 and 39. The connection from diode 31 and resistance 33 is made in the line between diodes 35 and 36 and the connection from diode 32 and resistance 34 is made in the line between diodes 38 and 39.

Also connected to opposite ends of the secondary winding of transformer 11 are load windings 23 and 24 in a common connection with diodes 31 and 32, respectively. In series with load windings 23 and 24 are diodes 13 and 14, respectively, which connect across the regulator 10 output terminals 15 and 16 across which are resistances 17 and 18 in series. A connection is made between the common terminal of diodes 36 and 39 and zener diode 37 and the connection between resistances 17 and 18.

Figure 2:
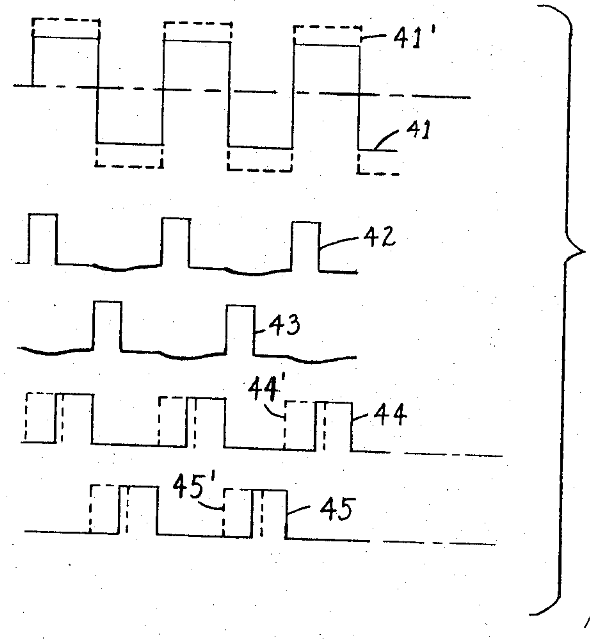
FIG. 2 depicts waveforms found at different points in the circuit of FIG. 1, plotting voltage versus time.

FIG. 2 depicts in a plot of voltage versus time some of the waveforms at different points in the circuitry of FIG. 1. A square wave generator 19 feeds square wave voltage form 41 through transformer 11. This square wave 41 is of constant frequency but may vary in amplitude as depicted by dashed outline 41'. If this voltage 41 which is supplied to magnetic amplifier 20, to load windings 23 and 24, varies in amplitude, the firing time of the magnetic amplifier will vary linearly with this voltage change. In order to prevent this variation of firing time with variation of input voltage amplitude, circuit 30 has been included. A zener diode 37 is used to limit the voltage seen by load windings 23 and 24. But the use of the zener diode 37 with associated diodes 35, 36, 38, 39 and connected as in FIG. 1, but without diodes 31 and 32 and with the connections to load windings 23 and 24 made from the opposite ends of resistances 33 and 34, respectively, from that shown in the figure, is not sufficient to also allow the magnetic amplifier 20 to reset as a function of control current through control windings 21 and 22. This is due to the low impedance path formed by resistance 17 and diodes 36 and 13 in series with load winding 23 and the equivalent path for load winding 24.

By adding diodes 31 and 32 and connecting the load windings 23 and 24 as shown in FIG. 1, a voltage drop appears across resistance 17 which back biases diode 13 such that the induced voltage on load winding 23 from the control current passing through control windings 21 and 22 sees a very high impedance circuit. The core of the magnetic amplifier 20 is then allowed to reset completely without imposing a load on the control circuit.

For begining the discussion of the circuit of FIG. 1, the top terminal of transformer 11 should be considered at positive potential. Current will flow through diodes 31, 35, zener diode 37, diode 39, and resistance 34, thereby completing the circuit to the opposite end of transformer 11. The voltage applied to load winding 23 is the forward voltage drop of diodes 31 and 35 and the zener voltage of zener diode 37 minus the voltage drop of diode 13. Resistance 34 is in the circuit during this half cycle.

During the next half cycle, diode 31 blocks allowing resistance 17 to be switched into the circuit. The voltage drop across resistance 17 is impressed across diode 31 and diode 13. The voltage across diode 13 prevents any current from flowing in load winding 23 of magnetic amplifier 20 thereby allowing the core associated with load winding 23 to be reset by current flowing through control winding 21, allowing maximum sensitivity to the control circuit to exist. The control circuit comprises control windings 21 and 22 fed by current in any appropriate manner, which is not part of the present invention. Both of control windings 21 and 22 may in actual practice be a single winding wound through two cores. During this same half cycle the voltage applied across load winding 24 is the sum of the voltage drops across diodes 32 and 38, zener diode 37, and diode 36, minus the drop across diode 14.

On the third half cycle, resistance 34 is in the circuit and the voltage drop across resistance 34 is used to back bias diode 14. This allows the core associated with load winding 24 to be reset by the control current through control winding 22. By having diode 14 non-conductive, full sensitivity can be attained by control winding 22.

Therefore, although the amplitude of the input voltage 41 varies, the firing time of the timing pulses 42 and 43 across load winding 23 and 24, respectively, is set by this input voltage 41 cycling but this timing does not vary. It will be noted that this remains true although output voltages 44 and 45 which show across resistances 17 and 18, respectively, vary in their firing time (44' and 45').

Also, it should be noted that the circuit of FIG. 1 allows full wave control where the first half cycle is controlled by load winding 23 and the next half cycle is controlled by load winding 24.

It will be obvious to those skilled in the art that various changes may be made without departing from the spirit of the invention and therefore the invention is not limited to what is shown in the drawings and described in the specification but only as indicated in the appended claims.

What is claimed is:

1. A control system adapted to control the gating of silicon controlled rectifiers comprising a magnetic amplifier having load windings and control windings wound around at least one core, a square wave source including a transformer with its secondary winding connected in series with said load windings, an output resistance means connected serially with said load windings and having a pair of diodes in series therewith in opposing relation to each other, an intermediate circuit means connected in the system with said square wave source to limit voltage and allow resetting of said at least one core of said magnetic amplifier including a plurality of diodes in rectifying circuit relationship, a zener diode in parallel relationship with a first pair of said plurality of diodes and with a second pair of said plurality of diodes, and having one end connected to a center point on said output resistance means, a diode and resistance parallel arrangement having one common end terminal connected to one end of said secondary winding of said transformer and the opposite common end terminal connected between said first pair of said plurality of diodes, and a second diode and resistance parallel arrangement having one common end terminal connected to the opposite end of said secondary winding of said transformer and the opposite common end terminal connected between said second pair of said plurality of diodes.

2. A control system adapted to control the gating of silicon controlled rectifiers comprising a magnetic amplifier having load windings and control windings wound around at least one core, a square wave source and an output resistance means connected serially with said load windings and having a pair of diodes in series therewith in opposing relation to each other, a circuit control means with connection between said square wave source and each of said load windings and to an intermediate point of said output resistance means, said circuit control means including in series connection a first diode, two pairs of diodes connected in parallel having a zener diode connected to a point between each of said pairs of diodes, and a second diode.

3. The control system of claim 2, further characterized by said intermediate point of said output resistance means connected to one end of said zener diode in said circuit control means.

References Cited

UNITED STATES PATENTS

| | | | |
|---|---|---|---|
| 2,780,782 | 2/1957 | Bright | 307—88.5 X |
| 2,809,303 | 10/1957 | Collins | 307—88.5 X |
| 3,177,447 | 4/1965 | Geyger | 323—89 X |
| 3,252,077 | 5/1966 | Schonholzer et al. | 323—22 |

JOHN F. COUCH, *Primary Examiner.*

W. E. RAY, *Examiner.*